Jan. 21, 1964  G. STEELS ETAL  3,118,395
MANUFACTURE OF BOILED SUGAR CONFECTIONERY
Filed March 4, 1963  5 Sheets-Sheet 1

INVENTORS
Gordon Steels
George D. Wilson

By Watson, Cole, Grindle & Watson
ATTORNEYS

Jan. 21, 1964   G. STEELS ETAL   3,118,395
MANUFACTURE OF BOILED SUGAR CONFECTIONERY
Filed March 4, 1963   5 Sheets-Sheet 2
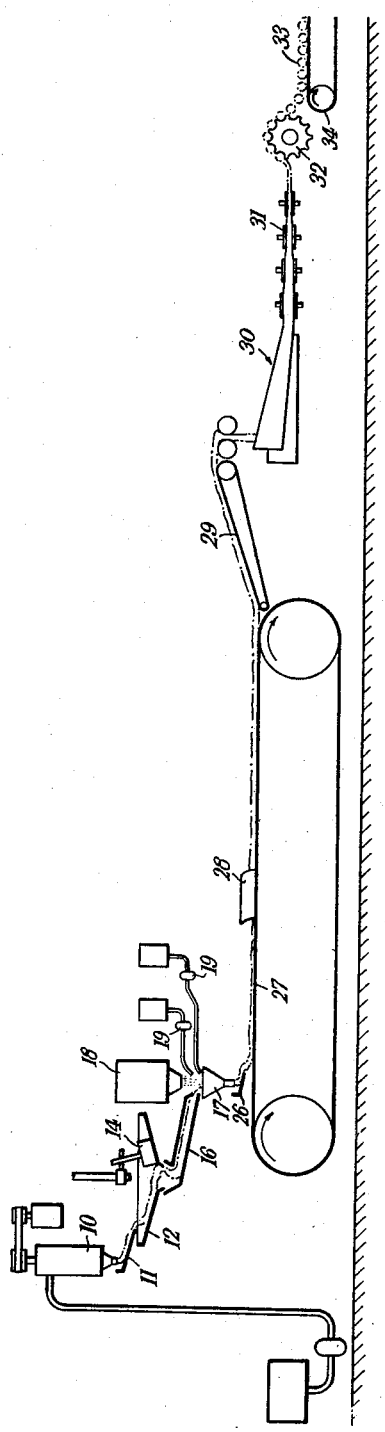
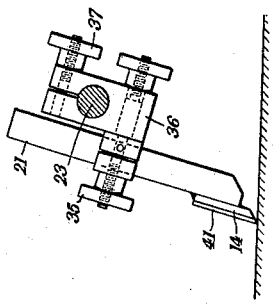

Jan. 21, 1964   G. STEELS ETAL   3,118,395
MANUFACTURE OF BOILED SUGAR CONFECTIONERY
Filed March 4, 1963   5 Sheets-Sheet 3

INVENTORS
Gordon Steels
George D. Wilson

By Watson, Cole, Grindle & Watson
ATTORNEYS

Jan. 21, 1964 G. STEELS ETAL 3,118,395
MANUFACTURE OF BOILED SUGAR CONFECTIONERY
Filed March 4, 1963 5 Sheets-Sheet 4

INVENTOR
Gordon Steels
George D. Wilson
By Watson, Cole, Grindle & Watson
ATTORNEYS Jan. 21, 1964    G. STEELS ETAL    3,118,395
MANUFACTURE OF BOILED SUGAR CONFECTIONERY
Filed March 4, 1963    5 Sheets-Sheet 5

United States Patent Office 3,118,395
Patented Jan. 21, 1964

3,118,395
MANUFACTURE OF BOILED SUGAR
CONFECTIONERY
Gordon Steels and George Donald Wilson, Peterborough, England, assignors to Baker Perkins Holdings Limited, Peterborough, England, a British company
Filed Mar. 4, 1963, Ser. No. 262,494
Claims priority, application Great Britain Mar. 7, 1962
6 Claims. (Cl. 107—4)

In United States Patent No. 3,063,391 we have described and claimed apparatus for manufacturing confectionery comprising a downwardly tapering funnel, means for feeding a ribbon of hot cooked sugar into the upper end of the funnel, mechanism for rotating the funnel continuously and means for discharging additives into the funnel and on to the sugar on the inner surface thereof.

In the apparatus specifically described in said specification the sugar is delivered from the cooling table of the cooker to the rotary funnel by means of a chute, and a chute nine feet in length has been found to be satisfactory when sugar discharged from the cooker at 305° F. has to be cooled to 280° F. prior to its entering into the funnel.

The addition of acid to sugar at a temperature above 280° F. causes inversion of the sugar and discolouration, and a chute is not appropriate for delivering the sugar from the cooling table of the cooker to the rotary funnel when the sugar is discharged from the cooker at a considerably higher temperature, e.g. 325° F. This is because the sugar flowing over the surface of the chute tends to form a skin as it cools, resulting in a build up of sugar on the chute which reduces the cooling effect of the chute. To prevent such skin formation the temperature of the chute must be raised to reduce the rate of cooling, but this necessitates increase of the length of the chute to a value which is impracticable. Also the sugar will tend to discolour as the result of caramelization if left on a heated chute for a period of time, so that rapid removal of heat from the sugar leaving the cooker is necessary. The present invention provides a modified form of apparatus capable of effectively cooling the sugar on its way from the cooker to the rotary funnel through a wider range of temperature, e.g. from 325° F. to 280° F. or even down to 230° F., and in a shorter period of time.

The invention provides an apparatus for the manufacture of confectionery comprising a continuous sugar cooker, a rotary cooling table disposed beneath the cooker and having a central discharge orifice, a short chute for delivering cooked sugar from the cooker to the table and one or more adjustable ploughs for engaging the sugar on the table and diverting it into the discharge orifice.

Preferably the chute is mounted for angular adjustment with respect to the table. Preferably also the sugar is discharged from the cooling table to a rotary funnel and means are provided for discharging additives into the funnel and on to the sugar on the inner surface thereof.

Certain forms of apparatus according to the invention are illustrated by way of example with reference to the accompanying drawings, in which:

FIG. 2 is a diagrammatic side elevation of the second form of apparatus,

Figure 1:
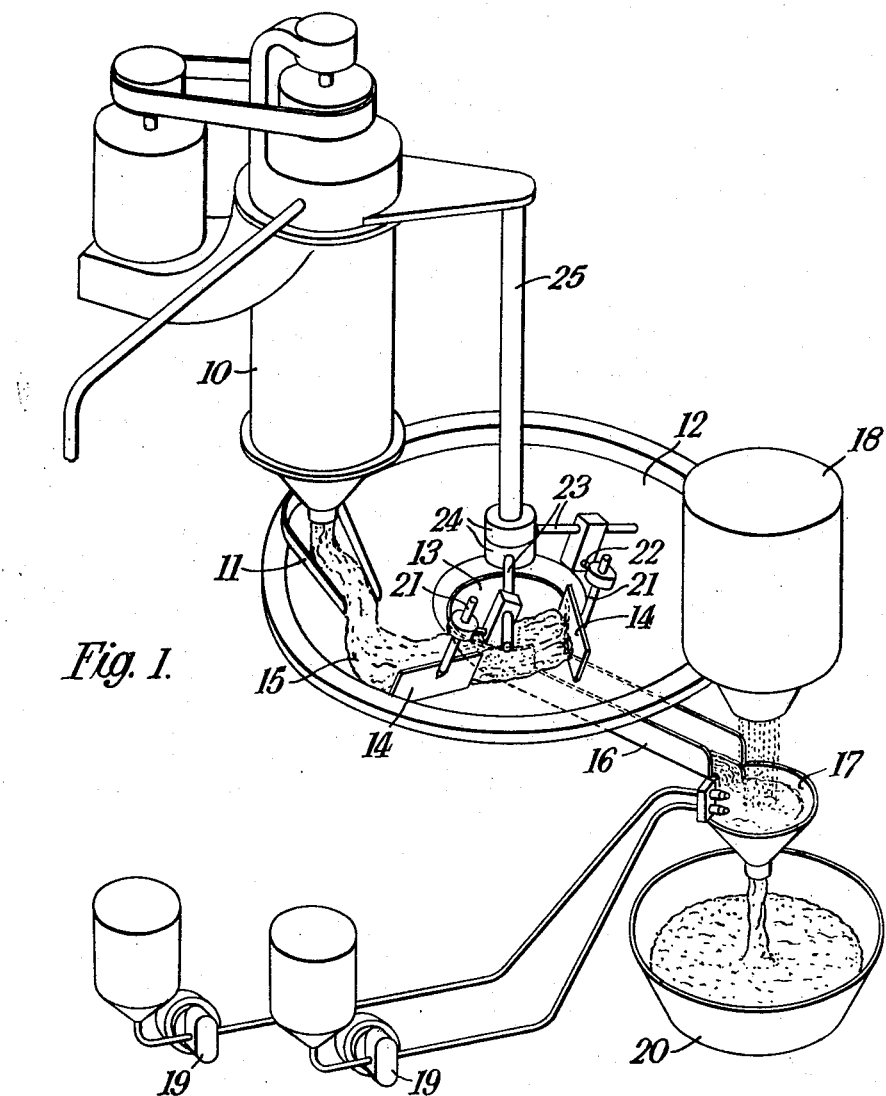
FIG. 1 is a diagrammatic perspective view of the first form of apparatus.
Figure 3:
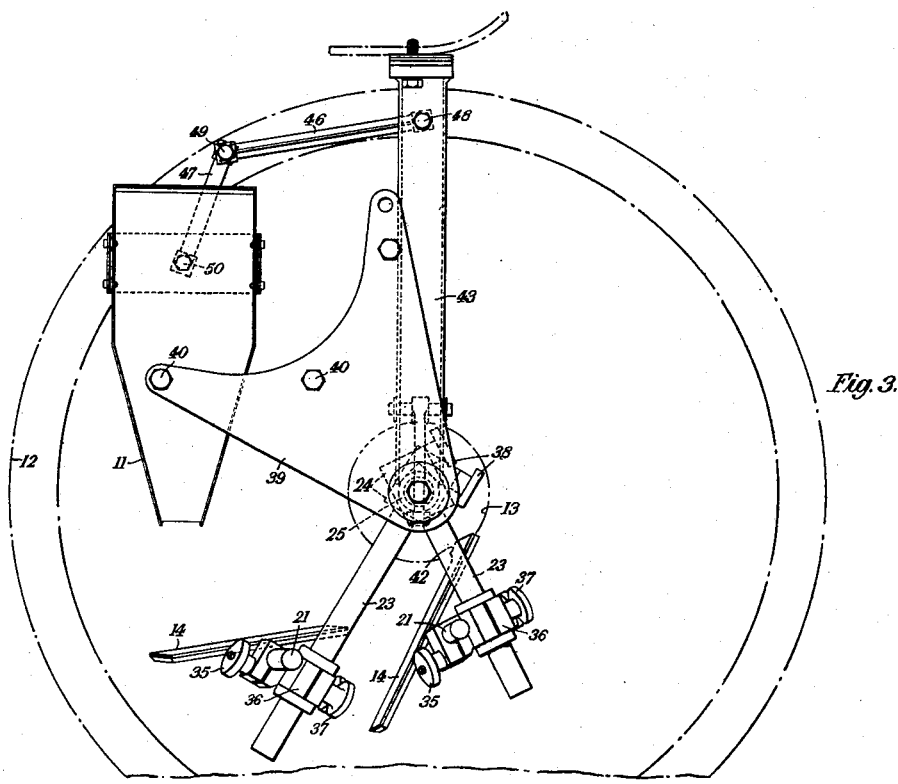
Figure 4:
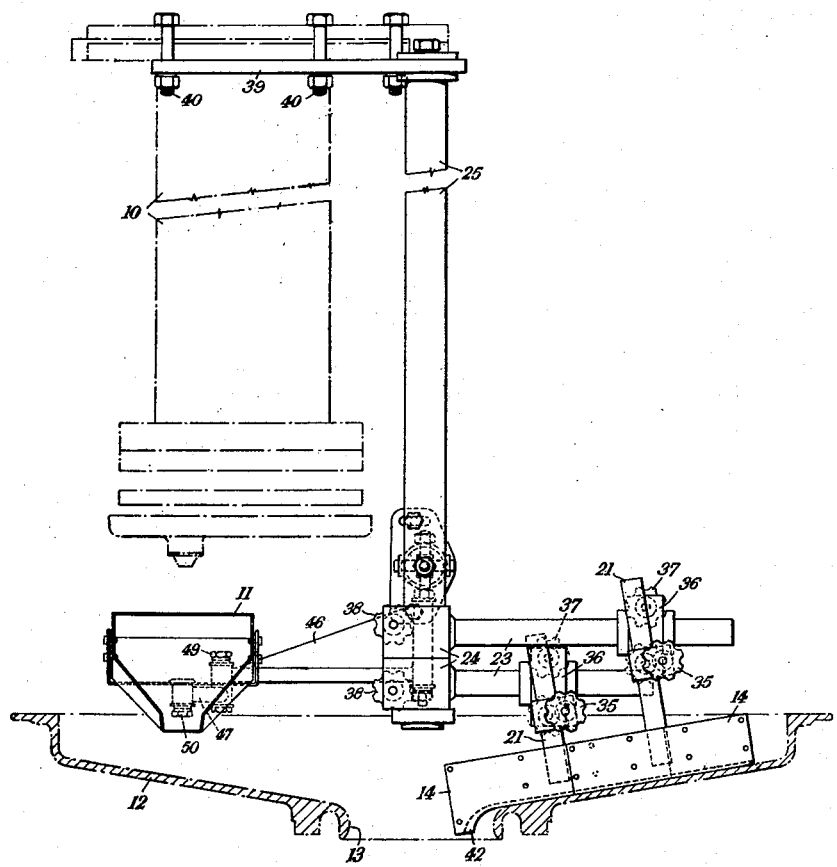
Figure 7:
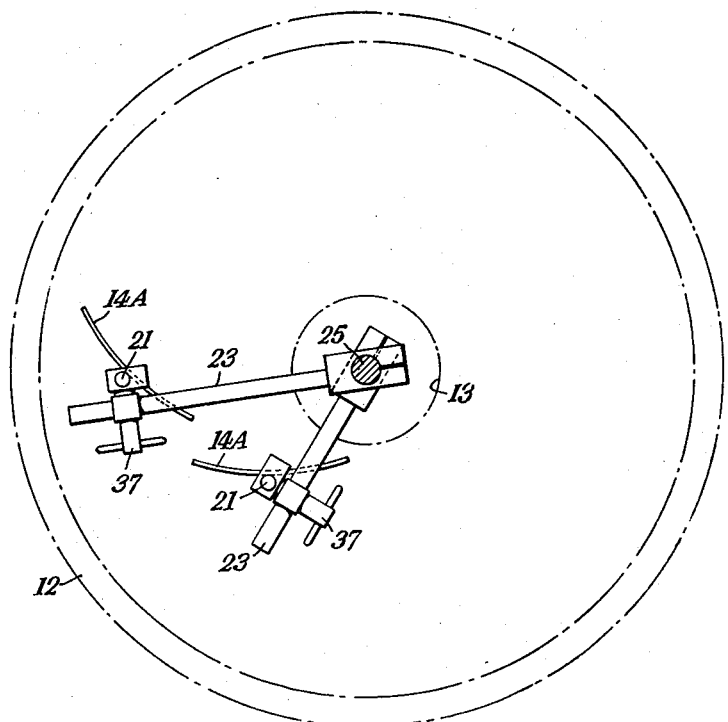
Figure 6:
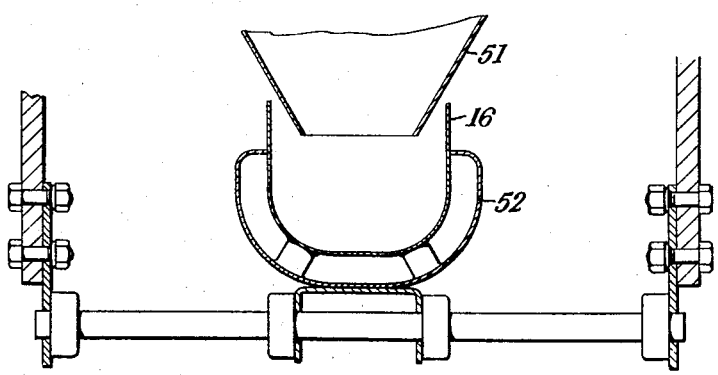

FIG. 3 is a plan view of the cooling table of the apparatus shown diagrammatically in FIG. 1, FIG. 4 is a corresponding side elevation, partly in section, but showing the ploughs in a different position, FIG. 5 is an end elevation of one of the ploughs, FIG. 6 is a section of the discharge chute leading from the cooling table to the rotary funnel, and FIG. 7 is a plan view of the cooling table fitted with ploughs of a different configuration.

Like reference numerals indicate like parts throughout the figures.

Turning first to FIG. 1, 10 represents a Microfilm (registered trademark) cooker having an angularly adjustable discharge chute 11 for discharging cooked sugar continuously on to a rotary water-cooled table 12 having a central discharge orifice 13. The table 12 rotates slowly, e.g. at 4 r.p.m. Two ploughs 14 plough the cooled stream 15 of sugar on the table into the discharge orifice 13, from which the sugar flows along a steam jacketed chute 16 to a rotary funnel 17 of the kind described in United States Patent No. 3,063,391. Powdered acid is delivered to the sugar in the funnel 17 from a dispenser 18 and liquid additives, i.e. flavouring and colouring are added by metering pumps 19. The sugar is discharged from the funnel 17 into a collecting pan 20.

The cooled upper and lower surfaces of the stream of sugar on the table 12 are brought together and the whole mass of sugar is brought to a uniform temperature as it flows down the chute 16. This chute is maintained at the temperature at which it is desired to deliver the sugar to the funnel 17. The solidified cooled undersurface of the stream of sugar is thus re-melted by the liquid sugar in the chute 16.

The ploughs 14, which are preferably faced with polytetrafluorethylene or other material which will not stick to the sugar and may be jacketed for circulation of cooling liquid, are adjustable both angularly and radially in relation to the table 12. Each plough is attached to a rod 21, which is angularly adjustable in relation to an arm 22 which, in turn, is angularly adjustable in relation to an arm 23 carried by a collar 24 rotatably mounted on a pillar 25.

The mounting of the ploughs 14 and the chute 11 is shown more clearly in FIGS. 3–5. As there shown the rod 21 carrying each plough 14 is adjustable in relation to a supporting bracket 36 about an axis normal to the table 12 and can be locked in adjusted position by a screw 35. The bracket 36 can be moved along the horizontal arm 23 and locked in position by a screw 37. Each arm 23 can be adjusted angularly in relation to the pillar 25 and locked in position by a screw 38. The pillar 25 is secured to a fixed part of the machine frame by a bracket 39 and bolts 40. FIG. 5 shows the facing 41 of polytetrafluorethylene on the plough blade and indicates that the plough blade is inclined to the vertical at an angle of the order of 15°. As shown most clearly in FIG. 4, one of the ploughs 14 has a nose 42 which extends into the discharge orifice 13.

The chute 11 is supported from a horizontal arm 43, attached to the pillar 25, by a cranked linkage 46, 47. By loosening and retightening nuts 48, 49, 50 the position of the chute 11 in relation to the table 12 can be adjusted.

FIG. 6 shows the chute 16, to which sugar is delivered from the discharge orifice 13 through a spout 51 and which is provided with a heating jacket 52.

The apparatus shown in FIG. 2 is generally similar to that of FIG. 1 but in this case the sugar is discharged from the funnel 17, along a chute 26 which rotates with the funnel, on to a cooling conveyor band 37 provided with a plough 28 which forms the sugar on the band into a ribbon. The ribbon of sugar is delivered from the band 27, by a conveyor 29, to a former 30. Thence the resulting rope of sugar is passed through sizing rolls 31 to a moulding machine 32 which forms the sugar into tablets 33, which are carried away by a conveyor 34.

FIG. 7 shows a construction similar in all essential respects to that of FIG. 3 except that the ploughs 14A are curved instead of straight.

What we claim as our invention and desire to secure by Letters Patent is:

1. Apparatus for the manufacture of confectionery comprising a continuous sugar cooker, a rotary cooling table disposed beneath the cooker and having a central discharge orifice, a short chute for delivering cooked sugar from the cooker to the table and one or more adjustable ploughs for engaging the sugar on the table and diverting it into the discharge orifice.

2. Apparatus as claimed in claim 1, in which the chute is mounted for angular adjustment in respect to the table.

3. Apparatus as claimed in claim 1, which includes a rotary funnel for receiving the sugar discharged from the table and means for discharging additives into the rotary funnel and on to the sugar on the inner surface thereof.

4. Apparatus as claimed in claim 1, in which the table is fitted with at least two ploughs, one of which has a nose for engaging the discharge orifice in the table.

5. Apparatus as claimed in claim 1, in which each plough is mounted on a horizontal arm which is angularly adjustable in relation to a vertical pillar, the plough also being mounted for angular adjustment with respect to the arm about an axis normal to the table and for longitudinal adjustment along the arm.

6. Apparatus as claimed in claim 1, in which each plough is constituted by a blade inclined to the vertical at an angle of the order of 15°.

References Cited in the file of this patent

UNITED STATES PATENTS

| | | |
|---|---|---|
| 390,720 | Kirchoff et al. | Dec. 23, 1884 |
| 811,086 | Pratts | Jan. 30, 1906 |
| 1,639,319 | Weber et al. | Aug. 16, 1927 |
| 1,682,146 | Riebe | Aug. 28, 1928 |
| 1,757,384 | Ponisch | May 6, 1930 |
| 1,778,537 | Steely | Oct. 14, 1930 |
| 1,796,934 | Laureys | Mar. 17, 1931 |
| 2,949,868 | Ruffinatti | Aug. 23, 1960 |
| 3,063,391 | Johnston et al. | Nov. 13, 1962 |

FOREIGN PATENTS

| | | |
|---|---|---|
| 554,217 | Italy | Jan. 9, 1957 |